United States Patent
Constantine

(10) Patent No.: US 8,387,861 B2
(45) Date of Patent: *Mar. 5, 2013

(54) METHODS OF ESTABLISHING CREDIT

(75) Inventor: Tommy Constantine, Scottsdale, AZ (US)

(73) Assignee: Eufora LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/232,567

(22) Filed: Sep. 14, 2011

(65) Prior Publication Data

US 2012/0004963 A1    Jan. 5, 2012

Related U.S. Application Data

(63) Continuation of application No. 12/966,477, filed on Dec. 13, 2010, now Pat. No. 8,020,755, which is a continuation of application No. 12/543,302, filed on Aug. 18, 2009, now Pat. No. 7,850,070, which is a continuation of application No. 10/841,062, filed on May 7, 2004, now Pat. No. 7,607,570, which is a continuation-in-part of application No. 10/263,321, filed on Oct. 2, 2002, now Pat. No. 6,739,506.

(51) Int. Cl.
*G06K 5/00* (2006.01)

(52) U.S. Cl. ........ 235/375; 235/382

(58) Field of Classification Search ........ 235/375, 235/379, 380, 381, 382
See application file for complete search history.

(56) References Cited

U.S. PATENT DOCUMENTS

| | | | | |
|---|---|---|---|---|
| 5,025,372 A * | 6/1991 | Burton et al. | ........ | 705/14.17 |
| 5,537,314 A * | 7/1996 | Kanter | ........ | 705/14.13 |
| 5,852,811 A * | 12/1998 | Atkins | ........ | 705/36 R |
| 5,878,405 A * | 3/1999 | Grant et al. | ........ | 705/39 |
| 6,009,415 A * | 12/1999 | Shurling et al. | ........ | 705/35 |
| 6,571,290 B2 * | 5/2003 | Selgas et al. | ........ | 709/228 |
| 6,739,506 B1 * | 5/2004 | Constantine | ........ | 235/380 |
| 7,607,570 B1 * | 10/2009 | Constantine | ........ | 235/375 |
| 7,850,070 B2 * | 12/2010 | Constantine | ........ | 235/375 |
| 8,020,755 B2 * | 9/2011 | Constantine | ........ | 235/375 |
| 2002/0198825 A1 * | 12/2002 | Jentoft | ........ | 705/39 |

* cited by examiner

*Primary Examiner* — Daniel St. Cyr
(74) *Attorney, Agent, or Firm* — SNR Denton LLP

(57) ABSTRACT

A method for enhancing credit of a cardholder of a pre-paid card may include issuing a pre-paid card to a cardholder. The cardholder may be charged a fee to establish a credit instrument associated with an account and the pre-paid card. The cardholder may be billed a portion of the credit instrument that includes the fee on a periodic basis, where the billing may be independent of billing for purchases of goods and services with the pre-paid card. A determination as to whether the cardholder timely paid the bill. If the cardholder timely paid the bill, then the payment may be recorded as being timely paid. Otherwise, a recording may be made that the bill was not timely paid. A reporting as to the timeliness of the payment may be made to affect a credit rating of the cardholder.

21 Claims, No Drawings

METHODS OF ESTABLISHING CREDIT

CROSS-REFERENCE TO RELATED APPLICATION

This Application is a Continuation Application of U.S. patent application Ser. No. 12/966,477 filed Dec. 13, 2010 now U.S. Pat. No. 8,020,755, which is a Continuation of U.S. patent application Ser. No. 12/543,302 filed Aug. 18, 2009, now issued as U.S. Pat. No. 7,850,070, which is a Continuation of U.S. patent application Ser. No. 10/841,062 filed May 7, 2004, now issued as U.S. Pat. No. 7,607,570 on Oct. 27, 2009, which is a Continuation-in-Part of U.S. patent application Ser. No. 10/263,321, filed Oct. 2, 2002, now issued as U.S. Pat. No. 6,739,506 on May 25, 2004, the contents of which are herein incorporated by reference in their entirety.

FIELD OF THE INVENTION

The principles of the present invention relate to credit, and, more particularly, to methods of establishing credit, and to methods of enhancing the value of bank cards, both to card holders and to the banks or issuers of bank card.

BACKGROUND

Credit cards are devices most commonly represented by a plastic card-like member through the use of which an authorized user pays for, by way of example, services and/or merchandise and the like. Credit cards are universally well known and ubiquitous, and have fundamentally changed the very manner in which financial transactions and dealings are viewed and conducted in society today. Credit cards are generally issued by a bank and provide a mechanism by which a user purchases goods without an immediate, direct exchange of cash and thereby incurs debt which the user may thereafter (i.e. upon receipt of a monthly or otherwise periodic statement) either pay the outstanding balance or, as a matter of choice, defer the balance for later payment with accompanying interest or finance charges for the period during which payment of the debt is deferred.

Increasingly, credit cards are being issued by banks and the like in association with other organizations/enterprises that offer or sell goods and/or services. This phenomenon, known as co-branding, provides a credit card that typically carries the name of a commercial company, with the commercial company or co-branding "partner" bringing to the card holder of user added benefits which, not incidentally, assist the partner in the sale of its goods or services to the card user. Well known and successful examples of such co-branded cards include the General Motors MasterCard credit card—offering users up to a five-percent rebate on user-purchased General Motors automobiles, based on the volume of charges placed on the user's card—and airline-partnered credit cards which award the card user frequent flyer mileage on the basis of user-accrued card charges.

Current co-branded credit cards, although successful, may nevertheless lack additional actual or perceived advantages, to the user and/or to the issuer and/or commercial partner, which may perhaps otherwise be available or attainable. For example, the rapid proliferation of co-branded cards offering seemingly ever-increasing amounts or levels of user-earned "benefits" encourages individual users or subscribers to obtain multiple credit cards, by which users often correspondingly split or divide their purchases and transactions—previously charged on a single card—between a number of cards, thereby decreasing the transaction volume of each card at the expense of one or more others. Moreover, permitting users to earn awards based on purchases encourages users to incur increasing amounts of debt, at times exceeding the amount that a user is reasonably capable of repaying in a timely manner, increasing the possibility of user default with consequent damage to the bank, to the commercial partner, and/or to the organization whose goods or services were charged in the user's transactions with the card.

Without a good credit history, it can be difficult to obtain a credit card, and to obtain vehicle loans and mortgage loans. A credit card is usually required to make hotel and plane reservations, and to rent a car. Many stores require a credit card to accept a personal check. Responsible use of a credit card builds a good credit history and rating. But people who have never had credit or need to repair a poor credit history may not qualify for a regular credit card. For them, a secured credit card is the only way to establish, or re-establish, credit.

A secured credit card is a credit card established by depositing money into an account. The account serves as security for the card; if the bill isn't paid, the money in the account may be used to cover the debt. For example, if a user places $500 in the account, she can charge up to $500. More can be added to the deposit to add more credit, and sometimes a bank will reward a good payment history and add to the user's credit line without requesting additional deposits.

The amount a user is required to deposit for a secured credit card can vary. A typical minimum deposit is $300 to $500, but there are service providers that have lower minimum deposit requirements. The credit limit for a secured credit card is either the amount of the deposit or a percentage above the deposit amount.

A secured credit card can be a valuable stepping stone for individuals trying to establish, or re-establish, credit. The interest rates and fees on secured credit cards tend to be lower than those charged on unsecured credit cards targeted toward people with poor or no credit. Even so, secured credit cards are hardly bargains. Interest rates in the high teens or higher are typical, and so are annual fees. Because annual fees vary dramatically from offer to offer, it is advisable to shop around for the best possible offer. Also, not everyone can obtain a secured credit card. Card companies have different requirements for applicants. Some credit card companies will accept people who have had a bankruptcy as recently as six months to one year before they apply. However, most require that a court has discharged the bankruptcy. And still others will not consider people with a past bankruptcy.

Accordingly, it is the principle of the invention to provide methods for establishing, and re-establishing, credit, and enhancing the value of a bank card so as to enhance a user's or potential user's perception of the desirability of holding or subscribing to the card and encourage increased use of the card for its normal utility as a payment device.

SUMMARY

One embodiment for a method for enhancing credit of a cardholder of a pre-paid card may include issuing a pre-paid card to a cardholder. The cardholder may be charged a fee to establish a credit instrument associated with an account and the pre-paid card. The cardholder may be billed a portion of the amount owed for the credit instrument that includes the fee on a periodic basis, where the billing may be independent from billing for usage of the pre-paid card for purchasing goods and services. A determination may be made as to whether the cardholder timely paid the bill for the portion of the credit instrument and the fee. If the cardholder timely paid the bill for the portion of the credit instrument and the fee, then a recording may be made that the payment was timely paid. Otherwise, a recording may be made that the bill for the portion of the credit instrument and the fee was not timely paid. A reporting as to the timeliness of the payment of the portion of the credit instrument and the fee may be made, where the timeliness of the payment may be used to affect a credit rating of the cardholder.

DETAILED DESCRIPTION

The present invention concerns, among other things, methods for enhancing the value of a bank card (hereinafter "bank card" or "card") so as to enhance an authorized user's or potential user's perception of the desirability of holding or subscribing to the card and encourage increased use of the card for its normal utility as a payment device, through which the user may incur debt. The invention allows authorized card users to earn income by referring customers to a bank card service provider and by participating in lottery/sweepstakes events by using their bank cards to make payments or purchases of goods and/or services, by incurring debt by using their bank cards, by repaying debt incurred from use of their bank cards. As used herein, the term "debt" is intended to collectively encompass all monetary/financial obligations incurred by an authorized user of the card, and all monies owed to the bank card service provider or issuer of the card for any and all forms of credit and/or debit presently or hereinafter extendible to the user of or subscriber to the card's services such as for, by way of nonexclusive example, services and merchandise purchases, cash advances or loans, subscription fees, and applied finance charges and the like. Similarly, the term "finance charges" should be understood as including, again by way of nonlimiting example, late fees, interest charges, bank fees and all other charges and assessments added to those debts directly incurred by a user through transactions such as purchases and cash advances and the like, such finance charges most commonly resulting from the user's decision to extend an outstanding balance due as of a particular billing period closing date. Furthermore, any general or special purpose credit or bank card or similar or equivalent instrument or mechanism including a pre-paid credit or bank card, or a debit card, whether or not represented or implemented in the form of a physical card or member or the like, through or in accordance with which an authorized user executes a transaction with an obligation to repay to the card or instrument issuer or sponsor is intended to be subsumed, for purposes of this disclosure, under the term "bank card" as used herein. It is to be understood that certain embodiments of the invention concern, with specificity, a credit card, or a pre-paid card. Pre-paid cards are funded in advance, in which purchases are deducted or debited against funds on deposit. Some prepaid cards are use-specific, such as the case with the VISA TRAVELMONEY card, which is funded in advance of travel-related purchases, such as plane ticket purchases, train ticket purchases, bus ticket purchases, etc.

As used herein, the term "authorized user" is a person named on or to a bank card. Because a corporation and other legally established entities are often referred to as legal persons or entities, such organizations are intended to be included with the scope of "authorized user." As used herein, the terms "bank card service provider," and "service provider" are interchangeable for the purpose of this disclosure and intended to include a financial institution or bank including one or more or any and all participants of the invention including one or more or any and all partners thereof, subsidiaries thereof, agents thereof, intermediates thereof, corporations thereof, legal entities thereof, benefactors thereof, investors thereof, third parties thereof, etc. In sum, any party participating in or otherwise facilitating the implementation of the invention as or on behalf or in conjunction and/or cooperation with the bank card service provider or service provider is intended to be subsumed, for the purpose of this disclosure, under each of the terms "bank card service provider" and "service provider". Also, it is well-understood in the art that a pre-paid card is one in which an authorized user applies a load or money to the pre-paid which is drawn against when the pre-paid card is used. Moreover, because a debit card is one in which money is taken from an existing funded account of an authorized user, such as a checking account, a savings account, etc., when the debit card is used, a debit card can be considered a pre-paid card.

In accordance with the principle of the invention, a preferred method includes providing an authorized user of a bank card issued by an issuer, namely, a service provider as herein defined. The service provider and the authorized user are participating members of the method, such as by a contractual agreement for bank card services, which is provided and offered by the service provider as a means to enhance the value of a bank card to enhance the authorized user's perception of the desirability of holding or subscribing to the bank card and to encourage increased use of the bank card for its normal utility as a payment device. In accordance with the principle of the invention, the authorized user refers a customer to the service provider for bank card services, in which the customer submits an application for bank card services (i.e., a credit card application, a debit card application, a pre-paid card application), to the service provider as a result of the referral. In one scenario, the service provider provides the authorized user with applications for bank card services for the authorized user to provide to referred customers. In another scenario, the referred customer contacts the service provider at the instruction of the authorized user, whether in person, by phone, by letter or written correspondence, by way of email, etc., requesting an application for bank card services, which, in due course, is then furnished to the referred customer by the service provider. The application for bank card services can be a hard copy, if desired. The application for bank card services can also be electronic, in which it is filled out and submitted, as a matter of example, online, such as through the service provider's web site. Any form of application for bank card services process can be used in accordance with the ordinary and readily available bank card application systems and methods currently in use by most large service providers. The application for bank card services is a typical one requesting personal and financial information and authorization of the service provider to, for instance, perform a credit check, etc., in which information provided about the customer by the application for bank card services is used by the underwriters of the service provider to determine whether to grant a bank card and if so, for instance, at what credit limit amount and percentage interest rate.

The service provider receives and processes/underwrites and, in accordance with the method, approves the application for bank card services, and issues a bank card to the referred customer establishing the referred customer as a referred authorized user of a bank card. In granting the referred authorized user bank card services, the service provider may require the payment of a nominal initial fee, i.e., a start-up or initiation fee. In consideration to the authorized user, which can now be considered a referring authorized user, for making a customer referral resulting in the service provider establishing a new referred authorized user of a bank card, in accordance with the principle of the invention, the service provider issues valuable consideration to the referring authorized user.

Preferably, the step of the customer submitting an application for bank card services to the service provider further includes the customer designating in the application for bank card services the authorized user as a referring party or as the referring authorized user. The referring party can be designated by name, social security number, by an account number assigned to the authorized user by the service provider, by a lettered and/or numbered code assigned to the authorized user by the service provider, etc. Applications for bank card services or brochures or marketing cards or other materials can be provided to the referring authorized user pre-printed with the information necessary for permitting referred customers to designated the authorized user as the referring party. For referring authorized users that own or operate a web site, the referring authorized user can use the website as a means of advertising the bank card services of the service provider and the designated referral code or other designation to use, and even a live link to the service provider's web site and this aspect is highly desirable. As a matter of example, the service provider can provide the referring authorized user with a banner add or other electronic add form encoded with or otherwise having the designated referral code or other designation for the referring authorized user. Users accessing the referring authorized user's web site and who subsequently use the designated code as a referral code for bank card services are considered referred customers in accordance with this disclosure. It is within the scope of the invention that the referring authorized user can use any suitable/desired/appropriate manner of marketing the bank card services of the service provider, including on the authorized user's web site.

In one embodiment, the valuable consideration is a monetary payment paid to the referring authorized user by the service provider by way of any suitable payment method, such as by check, wire transfer, etc. The monetary payment can also be delivered as a credit on the bank card account of the referring authorized user or a reduction of debt on the bank card account. In another embodiment, the valuable consideration is a gift such as a gift basket, jewelry, houseware, one or more gift certificate for one or more products and/or services, etc., whether provided by the service provider or by a participating party, vendor, restaurant, retail concern, etc., one or more free products and/or services whether provided by the service provider or other participating party, vendor, restaurant, retail concern, etc. A gift can be delivered to the referring authorized user by or at the behest of the service provider by way of any conventional shipping method. The service provider may require the referring authorized user to pick up the gift at a designated location. Any desired valuable consideration can be provided.

In accordance with the principle of the invention, the valuable consideration is preferably a monetary payment, which can be the same for each customer referred to the service provider by the referring authorized user or different, whether higher or lower as specified by the service provider. As a matter of example, the valuable consideration can be $100 for the first referred authorized user established from a customer referral made by the referring authorized user, $200 for the next referred authorized user established from a customer referral made by the referring authorized user, $300 for still the next referred authorized user established from a customer referral made by the referring authorized user, and so on and so forth. Other monetary amounts can be used and in varying increasing or decreasing increments.

The principles of the invention further provide the authorized user incurring debt on the bank card, which incurred debt and all account activity of the authorized user's bank card account is managed in accordance with well-established and well-known accounting techniques prosecuted by the service provider or other participating party, partner, accounting firm, etc. For a predetermined amount of debt incurred by the authorized user on the bank card, such as $20, $40, $60, $80, $100, $200, $500, $1,000, etc., or other selected and predetermined amount of incurred debt, the method further includes the service provider submitting an entry into a sweepstakes on behalf of the authorized user, and subsequently conducting a drawing from entries of the sweepstakes, wherein the entry of the authorized user is one of the entries. Although it is preferred that the service provider conduct and/or provide and otherwise implement the sweepstakes, it can be conducted by and/or provided or otherwise implemented by one or more other parties, such as with an independent lottery/sweepstakes. An example of this is the service provider entering the authorized user into a POWERBALL® sweepstakes or the like. The sweepstakes is conventional in nature and is a contest in which a prize, such as a car, a boat, a motorcycle, a house, a monetary prize, etc., is awarded to a winner of a random drawing, which winner can possibly by the authorized user. Delivery of prizes to a designated winner of the sweepstakes is made in a conventional manner in accordance with conventional sweepstakes practice.

The referred authorized user can participate in the foregoing method by referring a customer to the service provider for bank card services, and so on and so forth. An example of this is the referred authorized user, who will now be referred to as a first referred authorized user, referring a second customer to the service provider for bank card services, the second customer submitting an application for bank card services to the service provider, the service provider receiving and processing and approving the application and issuing a bank card to the second customer establishing a second referred authorized user of a bank card, and in consideration therefore to the first referred authorized user the service provider issuing valuable consideration to the first referred authorized user. The step of the second customer submitting an application for bank card services to the service provider further includes the second customer designating the first referred authorized user as a referring party, as previously explained. The invention further provides the second referred authorized user incurring debt on the bank card. For a predetermined amount of debt incurred by the second referred authorized user on the bank card, the method further includes the service provider submitting an entry into a sweepstakes on behalf of the second referred authorized user, and conducting a drawing from entries of the sweepstakes, wherein the entry of the second referred authorized user is one of the entries.

It will be understood that the invention cannot be facilitated if the service provider rejects an application for bank card services of a customer referred by a referring authorized user and refuses to issue a bank card to the referred customer. The exception to this is if the bank card is pre-paid by the referred customer. Accordingly, the use of pre-paid bank cards is intended to be within the scope of the invention, and this aspect was intimated supra.

Consistent with the foregoing teachings, the principles of the invention contemplates associated embodiments. And so in another aspect of the invention, a method includes providing an authorized user of a bank card issued by a service provider as explained supra, the authorized user referring a plurality of customers to the service provider for bank card services, the customers submitting applications for bank card services to the service provider, the service provider receiving and processing and approving the applications and issuing bank cards to the customers establishing a plurality of referred authorized users of bank cards, and in consideration therefore to the authorized user, the service provider issuing valuable consideration to the authorized user. The required plurality of referred authorized users needed to be established from customer referrals in order for the service provider to issue valuable consideration to the referring authorized user can be any number such as two, five, ten, twenty, etc. The customers submitting applications for bank card services to the service provider further includes the customers designating the authorized user as a referring party or referring authorized user, as previously explained. The valuable consideration is a monetary payment. In another embodiment, the valuable consideration is as gift as previously explained. The invention further provides the referring authorized user incurring debt on the bank card. For a predetermined amount of debt incurred by the referring authorized user on the bank card, the method further includes the service provider submitting an entry into a sweepstakes on behalf of the referring authorized user, and conducting a drawing from entries of the sweepstakes, wherein the entry of the authorized user is one of the entries. As previously explained, although it is preferred that the service provider conduct and/or provide and otherwise implement the sweepstakes, it can be conducted by and/or provided or otherwise implemented by one or more other parties, such as with an independent lottery/sweepstakes. The referred authorized users of this embodiment can participate in the foregoing method by referring customers to the service provider for bank card services as explained above, and so on and so forth.

In yet another aspect, the invention includes providing an authorized user of a bank card issued by a service provider, the authorized user referring customers to the service provider for bank card services, the customers submitting applications for bank card services to the service provider, the service provider receiving and processing and approving the applications and issuing bank cards to the customers establishing referred authorized users of bank cards, and in consideration therefore to the authorized user, the service provider issuing valuable consideration to the authorized user for every predetermined number of or set of referred authorized users of bank cards. The customers submitting applications for bank card services to the service provider further includes the customers designating the authorized user as a referring party or referring authorized user, as previously explained. The required number of for each set of referred authorized users needed to be established from customer referrals in order for the service provider to issue valuable consideration to the referring authorized user can be any number such as ten, twenty, thirty, etc. As a matter of example, the service provider issues valuable consideration to the referring authorized user for every ten referred authorized users resulting from customer referrals made by the referring authorized user, and so on and so forth. It can be some other number of established referred authorized users or varying numbers as may be desired, and the value of the valuable consideration issued to the referring authorized user for every predetermined set of referred authorized users resulting from customer referrals made by the referring authorized user can decrease or increase.

In accordance with the immediate embodiment, the valuable consideration is a monetary payment. In another embodiment, the valuable consideration is as gift as previously explained. It is preferred that the valuable consideration be a monetary payment. As a matter of example, the valuable consideration can be $100 for every ten referred authorized users established from customer referrals made by the referring authorized user, $200 for the next ten referred authorized users established from customer referrals made by the referring authorized user, $300 for still the ten next referred authorized users established from customer referrals made by the referring authorized user, and so on and so forth. Other monetary amounts can be used and in varying increasing or decreasing increments.

In accordance with the immediate embodiment, the invention further provides the referring authorized user incurring debt on the bank card. For a predetermined amount of debt incurred by the referring authorized user on the bank card, the method further includes the service provider submitting an entry into a sweepstakes on behalf of the authorized user, and conducting a drawing from entries of the sweepstakes, wherein the entry of the authorized user is one of the entries. As previously explained, although it is preferred that the service provider conduct and/or provide and otherwise implement the sweepstakes, it can be conducted by and/or provided or otherwise implemented by one or more other parties, such as with an independent lottery/sweepstakes. The referred authorized users of this embodiment can participate in the foregoing method by referring customers to the service provider for bank card services as explained above, and so on and so forth.

Consistent with the teachings of this disclosure and in accordance with the principle of the invention, a particular and exemplary method of the invention includes providing an authorized user of a pre-paid card issued by a service provider, the authorized user applying a load to the pre-paid card, and in response thereto or otherwise in response to the authorized user applying a predetermined amount of load to the prepaid card, the service provider submitting an entry into a sweepstakes on behalf of the authorized user. Further to the instant method is the step of conducting a drawing from entries of the sweepstakes, wherein the entry of the authorized user is one of the entries. Although it is preferred that the service provider conduct and/or provide the sweepstakes, it can be conducted by and/or provided by one or more other parties, such as with an independent lottery/sweepstakes. The present method further includes the authorized user referring a first customer to the service provider for card services, the first customer submitting an application for card services to the service provider, the service provider receiving, processing and approving the application and issuing a card to the first customer establishing a first referred authorized user of a card, and in consideration therefore to the authorized user the service provider issuing valuable consideration to the authorized user. The step of the first customer submitting an application for card services to the service provider further includes the first customer designating the authorized user as a referring party. The present method still further provides the first referred authorized user referring a second customer to the service provider for card services, the second customer submitting an application for card services to the service provider, the service provider receiving, processing and approving the application and issuing a card to the second customer establishing a second referred authorized user of a card, and in consideration therefore to the first referred authorized user the service provider issuing valuable consideration to the first referred authorized user. The step of the second customer submitting an application for credit card services to the service provider further includes the second customer designating the first referred authorized user as a referring party.

And still a further method embodiment of the invention consists of providing an authorized user of a bank card issued by a service provider, the authorized user incurring debt on the bank card, the authorized user repaying an amount of the debt, and in response thereto or otherwise in response to the authorized user repaying the amount of the debt, the service provider submitting an entry into a sweepstakes on behalf of the authorized user. Further to this embodiment is the step of conducting a drawing from entries of the sweepstakes, wherein the entry of the authorized user is one of the entries. Although it is preferred that the service provider conduct and/or provide the sweepstakes, it can be conducted by and/or provided by one or more other parties, such as with an independent lottery/sweepstakes. Still further to the present embodiment are steps of the authorized user referring a first customer to the service provider for card services, the first customer submitting an application for card services to the service provider, the service provider receiving, processing and approving the application and issuing a card to the first customer establishing a first referred authorized user of a card, and in consideration therefore to the authorized user the service provider issuing valuable consideration to the authorized user. The step of the first customer submitting an application for card services to the service provider further includes the first customer designating the authorized user as a referring party. Further to this method are steps of the first referred authorized user referring a second customer to the service provider for card services, the second customer submitting an application for card services to the service provider, the service provider receiving, processing and approving the application and issuing a card to the second customer establishing a second referred authorized user of a card, and in consideration therefore to the first referred authorized user the service provider issuing valuable consideration to the first referred authorized user. The step of the second customer submitting an application for card services to the service provider further includes the second customer designating the first referred authorized user as a referring party.

In a debt owed to a service provider by debtor, yet still another method of the invention includes the debtor repaying an amount of the debt, and in response thereto or otherwise in response to the debtor repaying the amount of the debt, the service provider submitting an entry into a sweepstakes on behalf of the debtor. This method further includes conducting a drawing from entries of the sweepstakes, wherein the entry of the debtor is one of the entries. Although it is preferred that the service provider conduct and/or provide the sweepstakes, it can be conducted by and/or provided by one or more other parties, such as with an independent lottery/sweepstakes. The present method further includes the debtor referring a first customer to the service provider for credit services, the first customer submitting an application for credit services to the service provider, the service provider receiving, processing and approving the application and issuing credit to the first customer establishing a first referred customer, and in consideration therefore to the debtor the service provider issuing valuable consideration to the debtor. The step of the first customer submitting an application for credit services to the service provider further includes the first customer designating the debtor as a referring party. Still further to the instant method are steps of the first referred customer referring a second customer to the service provider for credit services, the second customer submitting an application for credit services to the service provider, the service provider receiving, processing and approving the application and issuing credit to the second customer establishing a second referred customer, and in consideration therefore to the first referred customer the service provider issuing valuable consideration to the first referred customer. The step of the second customer submitting an application for credit services to the service provider further includes the second customer designating the first referred customer as a referring party.

As previously explained, without a good credit history, it can be difficult to obtain a credit card, and to obtain vehicle loans and mortgage loans. In an effort to help people establish or re-establish credit, a further embodiment of the invention consists of a credit-building method that includes providing an authorized user of a pre-paid card issued by a service provider, the service provider charging the authorized user a fee for the pre-paid card for which the authorized user is obligated to repay, and establishing a loan loaning the authorized user an amount equal to the fee under loan terms specifying a repayment schedule including periodic installments and a minimum amount due for each of the periodic installments, and the authorized user repaying the loan in accordance with the loan terms. The loan terms are set forth in a loan agreement, which is a written document that is, in accordance with the principle of the invention, duly and properly executed by the authorized user and the service provider and, more particularly, an authorized representative of the service provider. As the term suggests, the "loan terms" set for the mutually agreed-upon terms of the loan including, among other potential things typically included in a loan agreement, the amount of the loan, miscellaneous fees such as origination or closing fees, the interest rate if it is to be so provided, the term of the loan or loan period of time, and the repayment schedule including when the periodic installments/payments are to be made and the approximate or exact amount of each of the installments/payments, how the installments/payments are to be made, any applicable fees that may apply in the event of a late payment, etc. In a particular embodiment, the loan is an unsecured loan. In another embodiment, the loan is a secured loan, which is collateralized by the authorized user's vehicle, motorcycle, or other collateral of the authorized user.

The fee for the pre-paid card, and thus the loan amount (not including other potential applicable fees that may be added to the loan amount) is a specified and predetermined amount, such as $100, $150, $200, $300, $400, $500, $1000, or other predetermined specified amount for which the authorized user is obligated to repay over a predetermined period of time, namely, the loan period of time. In a particular embodiment, the loan period of time is six (6) months, in which a required installment/payment is to be made for each month, on or before a specified day. Preferably, the installments/payments are equal amounts. However, the installments/payments can be vary or be different, if desired. In another embodiment, the loan period of time is twelve (12) months, in which a required installment/payment is to be made for each month, on or before a specified day. It is to be understood that the loan period of time can be any desired period of time, and that the installments/payments can be made on a monthly basis, a bi-monthly basis, a weekly basis, a quarterly basis, etc. Nevertheless, the structure of the loan, including the loan period of time and the rate and nature of the installments/payments, is preferably designed to create a credit history for the authorized user that is to be reported to one or more credit bureaus and that creditors can use for determining the credit-worthiness of the authorized user.

As with a typical pre-paid credit card, the pre-paid card issued to the authorized user is funded in advance by the authorized user or by another or others on behalf of, or otherwise for, the authorized user, in which purchases are deducted or debited against the funds on deposit and the pre-paid card is refunded as needed so as to permit the authorized user to use the pre-paid card on an ongoing, uninterrupted basis. Because the pre-paid credit card is a funded payment vehicle, use of the pre-paid card is unreportable to credit bureaus. The provision of the loan in the instant method, however, is the mechanism that permits the authorized user to create a credit/payment history.

Accordingly, and in accordance with the principle of the invention, the present method further includes the authorized user establishing a credit history in conjunction with repaying the loan in accordance with the loan terms as previously discussed, and the service provider reporting the credit history to one or more credit bureaus, and preferably to at least one credit bureau, so as to establish a credit history that can be used by banks for determining the credit-worthiness of the authorized user. In accordance with the loan terms, throughout the loan period of time the authorized user is obligated, to make the periodic payments/installments against the loaned fee, and the authorized user's payment history throughout the term of the loan defines the credit history that is reported by the service provider to one or more credit bureaus, or otherwise to at least one credit bureau.

The fee charged to the authorized user for the pre-paid card can be designed simply to provide the authorized user with a mechanism to establish, or re-establish, credit. The fee charged to the authorized user for the pre-paid card can be a service fee charged by the service provider for establishing the pre-paid card account for the authorized user. The fee can be a one-time fee, if desired. In another embodiment, the fee can be charged repeatedly in order to keep the authorized user's pre-paid account open, such as a quarterly fee, a half-yearly fee, an annual fee, etc., in which each time the fee is charged to the authorized user the authorized user is obligated to repay the fee (loan) in accordance with the loan terms set forth in the loan agreement.

In response to the authorized user repaying the loan (or each loan in the case of an annual or period renewal fee charged to the authorized user by the service provider) in accordance with the loan terms, the instant method further includes the service provider submitting an entry into a sweepstakes on behalf of the authorized user. In response to the authorized user making an installment/payment toward satisfaction of the loan, in accordance with another embodiment of the invention and in accordance with the loan terms, the instant method further includes the service provider submitting an entry into a sweepstakes on behalf of the authorized user. In response to the authorized user making a predetermined number of installments/payments toward satisfaction of the loan (such as two or more installments/payments), in accordance with yet another embodiment of the invention and in accordance with the loan terms, the instant method further includes the service provider submitting an entry into a sweepstakes on behalf of the authorized user. In response to the authorized user repaying a predetermined amount of the loan (such as half of the loan amount, less than half of the loan amount, more than half of the loan amount, or other predetermined portion of the loan amount), in accordance with yet another embodiment of the invention and in accordance with the loan terms, the instant method further includes the service provider submitting an entry into a sweepstakes on behalf of the authorized user.

In another aspect of the invention in connection with the immediate embodiment, the instant method further includes the authorized user applying a load to the pre-paid card, and in response thereto or otherwise in response to the authorized user applying a predetermined amount of load to the prepaid card, the service provider submitting an entry into a sweepstakes on behalf of the authorized user. Further to the instant method is the step of conducting a drawing from entries of the sweepstakes, wherein the entry of the authorized user is one of the entries. Although it is preferred that the service provider conduct and/or provide the sweepstakes, it can be conducted by and/or provided by one or more other parties, such as with an independent lottery/sweepstakes. The present method further includes the authorized user referring a first customer to the service provider for card services, the first customer submitting an application for card services to the service provider, the service provider receiving, processing and approving the application and issuing a card to the first customer establishing a first referred authorized user of a card, and in consideration therefore to the authorized user the service provider issuing valuable consideration to the authorized user. The step of the first customer submitting an application for card services to the service provider further includes the first customer designating the authorized user as a referring party. The present method still further provides the first referred authorized user referring a second customer to the service provider for card services, the second customer submitting an application for card services to the service provider, the service provider receiving, processing and approving the application and issuing a card to the second customer establishing a second referred authorized user of a card, and in consideration therefore to the first referred authorized user the service provider issuing valuable consideration to the first referred authorized user. The step of the second customer submitting an application for bank card services to the service provider further includes the second customer designating the first referred authorized user as a referring party.

In an authorized user of a pre-paid card issued by a service provider, another yet still a further embodiment of the invention is a credit-building method that, consistent with the credit-building embodiment previously discussed, includes the service provider charging the authorized user a fee for the pre-paid card and establishing a loan loaning the authorized user an amount equal to the fee under loan terms specifying a repayment schedule including periodic installments and a minimum amount due for each of the periodic installments, and the authorized user repaying the loan in accordance with the loan terms. In accordance with the principle of the invention, the instant method further includes the authorized user establishing a credit history in conjunction with repaying the loan, and the service provider reporting the credit history to a credit bureau. In response to the authorized user repaying the loan, or in other embodiments repaying a portion or the loan such as by way of one or more installments/payments or a predetermined amount of the loan, in accordance with the loan terms, the instant method further includes the service provider submitting an entry into a sweepstakes on behalf of the authorized user. In another aspect of the invention, the instant method further includes the authorized user applying a load to the pre-paid card, and in response thereto or otherwise in response to the authorized user applying a predetermined amount of load to the prepaid card, the service provider submitting an entry into a sweepstakes on behalf of the authorized user. Further to the instant method is the step of conducting a drawing from entries of the sweepstakes, wherein the entry of the authorized user is one of the entries. Although it is preferred that the service provider conduct and/or provide the sweepstakes, it can be conducted by and/or provided by one or more other parties, such as with an independent lottery/sweepstakes. The present method further includes the authorized user referring a first customer to the service provider for card services, the first customer submitting an application for card services to the service provider, the service provider receiving, processing and approving the application and issuing a card to the first customer establishing a first referred authorized user of a card, and in consideration therefore to the authorized user the service provider issuing valuable consideration to the authorized user. The step of the first customer submitting an application for card services to the service provider further, includes the first customer designating the authorized user as a referring party. The present method still further provides the first referred authorized user referring a second customer to the service provider for card services, the second customer submitting an application for card services to the service provider, the service provider receiving, processing and approving the application and issuing a card to the second customer establishing a second referred authorized user of a card, and in consideration therefore to the first referred authorized user the service provider issuing valuable consideration to the first referred authorized user. The step of the second customer submitting an application for bank card services to the service provider further includes the second customer designating the first referred authorized user as a referring party.

In sum, the present invention allows authorized users of pre-paid credit cards to establish, or re-establish, credit, referring authorized users to earn income or to receive gifts or other valuable consideration from a service provider for referring customers to a service provider, provides incentives for authorized users to use their bank cards and to make bank card payments and to load pre-paid cards, and is described above with reference to preferred embodiments. Those skilled in the art will recognize that changes and modifications may be made in the described embodiments without departing from the nature and scope of the present invention. For instance, although monetary amounts discussed in this specification are expressed in dollars, any legal currency can be used.

The foregoing embodiments of the invention allow referring authorized users to earn income or to receive gifts or other valuable consideration from a service provider for referring customers to a service provider, provides incentives for authorized users to use their bank cards and to make bank card payments and to load pre-paid cards, and is described above with reference to preferred embodiments.

Various changes and modifications to the embodiments herein chosen for purposes of illustration will readily occur to those skilled in the art. To the extent that such modifications and variations do not depart from the spirit of the invention, they are intended to be included within the scope thereof.

What is claimed:

1. A method for enhancing credit of a cardholder of a pre-paid card, said method comprising:
   issuing a prepaid card to a cardholder;
   establishing an account associated with the prepaid card;
   applying a load to the account to create a first available balance for the cardholder;
   establishing a credit instrument associated with the account and the prepaid card;
   establishing a second available balance for the cardholder based on the credit instrument and the load;
   billing the cardholder at least a portion of the amount owed for the credit instrument; and
   reporting payment history of payments made by the cardholder and applied to the credit instrument associated with the prepaid card, the reporting being used to affect a credit rating of the cardholder.

2. The method according to claim 1, wherein billing the cardholder a portion of the credit instrument includes billing the cardholder an equal amount each billing period.

3. The method according to claim 1, wherein billing the cardholder at least a portion of the credit instrument is performed on a periodic basis.

4. The method according to claim 1, wherein reporting includes reporting on timeliness of a payment.

5. The method according to claim 1, further comprising charging the cardholder a fee to establish the credit instrument.

6. The method according to claim 5, further comprising applying a portion of the fee to the credit instrument, and wherein billing includes billing the cardholder a portion of the fee.

7. The method according to claim 5, further comprising charging the cardholder a second fee to establish the credit instrument each successive year to keep the account associated with the prepaid card.

8. The method according to claim 1, wherein issuing the prepaid card includes issuing a prepaid card that requires the cardholder to prepay a load prior to using the prepaid card, and wherein the cardholder is limited to spending up to the load amount plus available credit on the credit instrument when using the prepaid card.

9. The method according to claim 1, wherein billing the cardholder includes billing the cardholder on a period basis, and wherein reporting the timeliness of the payment includes reporting the timeliness of the payment consistent with the periodic basis.

10. The method according to claim 1, further comprising establishing terms by which the cardholder is to make payments for paying down the credit instrument and a fee charged to the cardholder to establish the credit instrument.

11. The method according to claim 10, wherein establishing the terms includes setting a minimum monthly payment for the cardholder to pay back the credit instrument and the fee.

12. The method according to claim 1, further comprising:
   receiving a referral for a potential new cardholder from the cardholder;
   in response to the potential new cardholder being authorized and accepting to become a new cardholder of a prepaid card, designating the cardholder as a referring party.

13. The method according to claim 12, further comprising issuing valuable consideration to the referring party for the referral of the new cardholder.

14. The method according to claim 13, wherein the valuable consideration is an entry into a sweepstakes.

15. The method according to claim 13, wherein the valuable consideration is a monetary payment to the referring party.

16. The method according to claim 13, wherein the valuable consideration is a debit amount being applied to the credit instrument and the fee.

17. The method according to claim 1, wherein billing the cardholder at least a portion of the credit instrument includes billing the cardholder an equal minimum amount each billing period.

18. The method according to claim 1, wherein reporting includes reporting payment history to at least one credit bureau.

19. The method according to claim 1, wherein billing the cardholder at least a portion of the credit instrument includes billing the cardholder a variable amount each billing period based on a credit balance of the credit instrument.

20. The method according to claim 1, wherein establishing the second available balance includes establishing the second available balance as an increase to the first available balance based on the credit instrument.

21. The method according to claim 20, further comprising:
   increasing the credit instrument; and
   increasing the second available balance in response to the credit instrument being increased.

* * * * *